US008499111B2

(12) United States Patent
Honta

(10) Patent No.: US 8,499,111 B2
(45) Date of Patent: Jul. 30, 2013

(54) INFORMATION PROCESSING APPARATUS AND CLOCK SIGNAL CONTROLLING METHOD CONTROLLING WHETHER CLOCK SIGNAL PROVIDED TO INTERRUPT SIGNAL CONTROLLING DEVICE

(75) Inventor: Mitsuo Honta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 12/961,083

(22) Filed: Dec. 6, 2010

(65) Prior Publication Data

US 2011/0138094 A1 Jun. 9, 2011

(30) Foreign Application Priority Data

Dec. 9, 2009 (JP) ................................. 2009-279592

(51) Int. Cl.
*G06F 13/24* (2006.01)
(52) U.S. Cl.
CPC ..................................... *G06F 13/24* (2013.01)
USPC ........................................... 710/262; 710/260
(58) Field of Classification Search
USPC ..................................... 710/260–269, 48–50
See application file for complete search history.

(56) References Cited

U.S. PATENT DOCUMENTS 5,590,380 A * 12/1996 Yamada et al. ................. 710/48
5,768,599 A *  6/1998 Yokomizo ..................... 710/260

6,507,609 B1 *  1/2003 Haubursin .................... 375/220
6,606,677 B1 *  8/2003 Okbay et al. .................. 710/262
7,308,518 B2 * 12/2007 Matsuyama .................. 710/243

FOREIGN PATENT DOCUMENTS

| JP | 58-222349 A | 12/1983 |
| JP | 4-145510 A | 5/1992 |
| JP | 7-121195 A | 5/1995 |
| JP | 7-244650 A | 9/1995 |
| JP | 7-261869 A | 10/1995 |
| JP | 10-301659 A | 11/1998 |

OTHER PUBLICATIONS

Japanese Office Action mailed May 7, 2013 for corresponding Japanese Application No. 2009-279592, with Partial English-language Translation.

* cited by examiner

*Primary Examiner* — Raymond Phan
(74) *Attorney, Agent, or Firm* — Fujitsu Patent Center

(57) ABSTRACT

An information processing apparatus includes an interrupting signal control device including a mask controller, the mask controller controlling whether or not to mask at least one interrupting signal serving as a trigger signal triggering a predetermined process; and a clock control device including an interrupting clock signal controller, the interrupting clock signal controller sends a clock signal to the interrupting signal control device when at least one interrupting signal is not masked, and stops sending the clock signal to the interrupting signal control device when at least one interrupting signal is masked.

16 Claims, 9 Drawing Sheets

INFORMATION PROCESSING APPARATUS AND CLOCK SIGNAL CONTROLLING METHOD CONTROLLING WHETHER CLOCK SIGNAL PROVIDED TO INTERRUPT SIGNAL CONTROLLING DEVICE

CROSS-REFERENCE TO RELATED APPLICATIONS

This application is based upon and claims the benefit of priority from the prior Japanese Patent Application No. 2009-279592 filed on Dec. 9, 2009, the entire contents of which are incorporated herein by reference.

FIELD

The embodiments relate to an information processing apparatus and a clock signal controlling method.

BACKGROUND

An information processing apparatus includes a plurality of control circuits performing a predetermined process. An interruption controller as one of the control circuits is arranged between a peripheral device and a central processing unit (CPU), and connected to the peripheral device and the CPU. One example of the CPU is a digital signal processor (DSP) executing a variety of processes.

The interruption controller receives from an external device an interrupting signal serving as a trigger signal triggering the predetermined process, and sends the interrupting signal to the DSP while determining the priority of the process and the timing of the process. Upon receiving the interrupting signal from the interruption controller, the DSP executes a process desired by the external device as a sending source of the interrupting signal. The interruption controller and the DSP are set to be operational in response to a clock signal.

Referring to FIGS. 7-9, the interruption controller and the DSP are discussed in detail below. FIGS. 7-9 illustrate a terminal device, such as a cellular phone, including the interruption controller and the DSP. As illustrated in FIGS. 7-9, the terminal device is a multi-DSP in which the two DSPs are related with one serving as a master and the other serving as a slave.

Referring to FIG. 7, a structure of the terminal device of related art is described. FIG. 7 illustrates the structure of the terminal device of related art. For example, the terminal device of FIG. 7 includes an antenna, a radio-frequency module, a baseband module, an interface module interfacing with the outside, a memory, application, and a power source. The baseband module includes a searcher, a demodulator, a decoder, an encoder, a modulator, and a command controller. The interface module interfacing with the outside includes a loudspeaker, a liquid-crystal display (LCD), a universal serial bus (USB), a camera, keys (control keys), and a microphone.

The antenna exchanges a variety of signals with a base station (not illustrated) and another terminal device. The radio-frequency module performs a control process related to transmission and reception of the variety of signals via the antenna. The command controller performs a variety of control processes in accordance with an application and a program stored in the memory. The demodulator demodulates an input signal. The modulator modulates a signal in accordance with a predetermined modulation method. The decoder decodes the input signal. The encoder generates encoded data. The searcher is described later.

The loudspeaker emits sounds. The microphone picks up sounds coming in through a prescribed opening. The LCD is a display. The keys are an input device inputting a variety of information and operation commands. The USB is a data transfer path connecting the terminal device to a peripheral device. The camera captures a still image or a moving image, and generates image data. The memory stores data related to a variety of processes and a variety of results of the processes. The application is a predetermined program. The power source supplies power to the terminal device.

Referring to FIG. 8, a structure of the searcher of related art is described below. FIG. 8 illustrates the structure of the searcher of related art. As illustrated in FIG. 8, interruption factors and interrupting signals are denoted by broken lines, internal bus signals are denoted by solid lines, and main input-output signals are denoted by heavy solid lines. The interruption factors are identical to the interrupting signals. The interruption controller performs a mask process on an interrupting signal. In the input phase of the interrupting signal to the interruption controller, the interrupting signal is referred to as an interruption factor.

Referring to FIG. 8, the searcher includes a command receiver, a command responding unit, a cell search unit, a path search processor, a fast Fourier transform (FFT) unit, and a bus controller. The searcher further includes an interruption controller (master), a DSP (master), an interruption controller (slave), and a DSP (slave).

The command receiver receives a command from the command controller and the command responding unit responds to a command from the command controller. Upon receiving a command, the searcher starts a cell search process, a path search process, and an FFT process. Upon completing each of the processes, the searcher performs a response process to the command.

The cell search processor includes a primary search channel (PSCH) processor, and a secondary search channel (SSCH) processor. The cell search processor detects a cell from a received signal, and detects a timing of a leading part of a radio-frequency frame. The path search processor detects from the received signal a timing of a leading part of an updated radio-frequency frame in response to the timing of the leading part of the radio-frequency frame detected by the cell search processor. The path search processor then determines a symbol timing from the detected timing of the leading part of the radio-frequency frame. The FFT processor performs a fast Fourier transform at the symbol timing determined by the path search processor.

The interruption controller (master) and the interruption controller (slave) receive the interrupting signals from each of the command receiver, the command responding unit, the cell search processor, the path search processor and the FFT processor. The interruption controller (master) and the interruption controller (slave) sends the received interrupting signals to the DSP (master) and the DSP (slave), respectively.

The DSP (master) manages command reception, command response, and startup processes. The DSP (slave) performs a cell search process and a path search process together with the cell search processor, and the path search processor, respectively. The bus controller inputs a bus signal received from each of the above-described elements to the command receiver and the command responding unit.

Referring to FIG. 9, the interrupting signal and the clock signal in the multi-DSP of related art are described. FIG. 9 illustrates the interrupting signal and the clock signal in the multi-DSP of related art. As illustrated in FIG. 9, a common clock signal (labeled CLK as illustrated) is supplied to the DSP (master), the DSP (slave), the interruption controller (master), and the interruption controller (slave). Upon receiving the clock signal, these elements are set to be operational.

With the clock signal supplied, the interruption controller (master) receives interruption factors A-C and an inter-DSP (slave) between the interruption controllers, and outputs the interrupting signal to the DSP (master). The inter-DSP interruption is sent after the completion of the process in the DSP, and is an interrupting signal to be exchanged between the master and the slave.

Similarly, with the clock signal supplied, the interruption controller (slave) receives interruption factors A-C and an inter-DSP (master) between the interruption controllers, and outputs the interrupting signal to the DSP (slave). The interruption controller (master) and the interruption controller (slave) are identical in circuit arrangement, and different only in the connection of terminals thereof to the outside.

The DSP (master) receives the interrupting signal from the interruption controller (master) and executes a desired process. The DSP (master), in response to a process completion notification, executes an inter-DSP interruption, masks the interruption factor or the interrupting signal in the interruption controller (master), and registers access to the interruption controller (master) to acquire the interruption factor.

The DSP (slave) executes a desired process in response to the reception of the interrupting signal from the interruption controller (slave). The DSP (slave) also executes an inter-DSP interruption responsive to a process completion notification, masks the interruption factor or the interrupting signal in the interruption controller (slave), and registers access to the interruption controller (slave) to acquire the interruption factor. Japanese Laid-open Patent Publication No. 7-261869 and Japanese Laid-open Patent Publication No. 7-121195 describe a related art technique in which the supply of a clock signal to a DSP is stopped when the DSP has not completed the relevant processing.

The related art technique has a problem that extra power is consumed. For example, an operational status is set in response to the supply of a clock signal, and out of the related interruption controller and DSP, the interruption controller is continuously supplied with the clock signal. In the related art technique, an interruption controller not executing any process consumes extra power, such as power consumed during an idling period. As a result, the DSP and the interruption controller not executing any process remain in an operational status, and extra power is consumed.

SUMMARY

According to an aspect of an embodiment, an information processing apparatus includes an interrupting signal control device including a mask controller, the mask controller controls whether or not to mask at least one interrupting signal serving as a trigger signal triggering a predetermined process; and a clock control device including an interrupting clock signal controller, the interrupting clock signal controller sends a clock signal to the interrupting signal control device when at least one interrupting signal is not masked, and stops sending the clock signal to the interrupting signal control device when at least one interrupting signal is masked.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

DETAILED DESCRIPTION OF THE EMBODIMENTS

Figure 1:
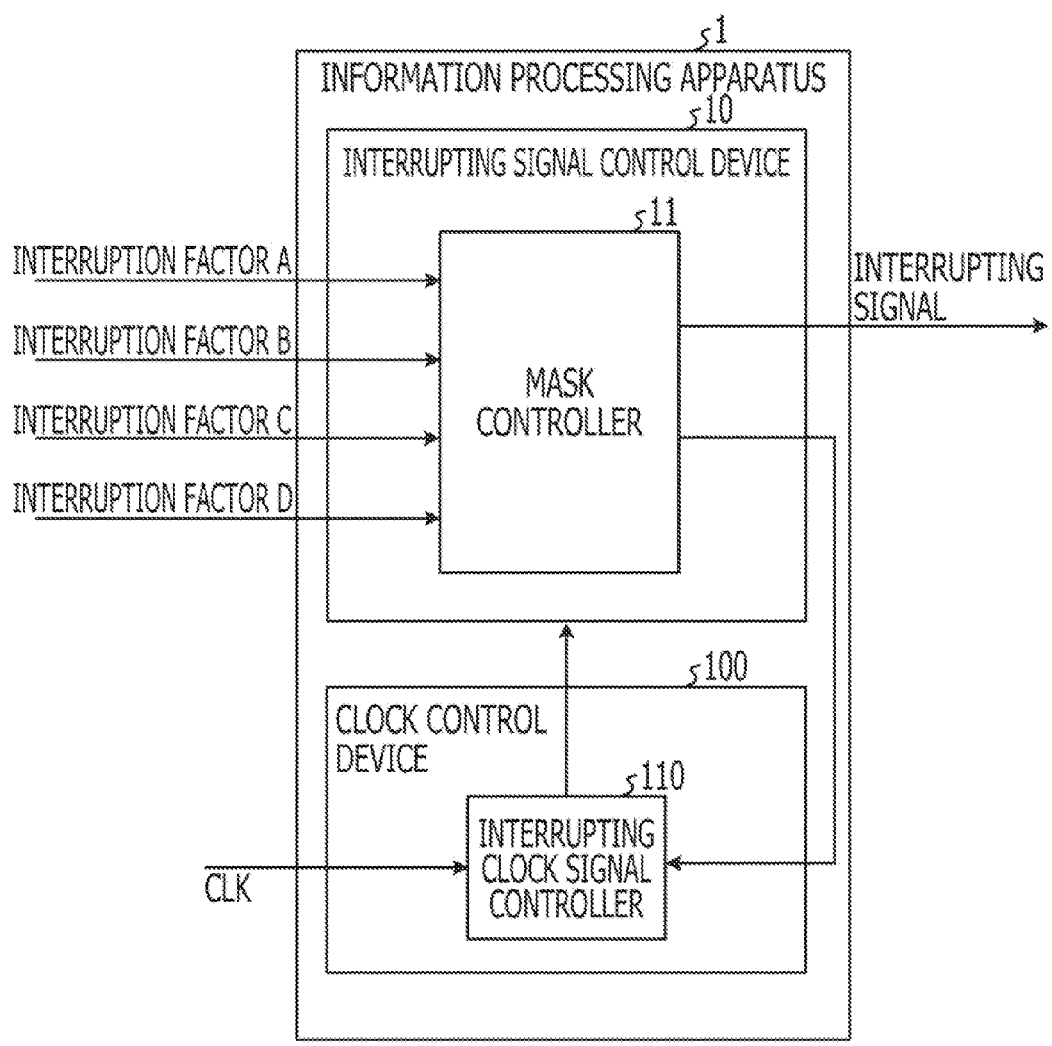
FIG. 1 illustrates a structure of an information processing apparatus of a first embodiment.

Referring to the drawings, the embodiments of information processing apparatus of the present application are described below. The embodiments discussed below are not intended to limit the present invention. The embodiments may be appropriately combined together within a range that causes no conflict within the content of the embodiments.

First Embodiment

Referring to FIG. 1, a structure of an information processing apparatus 1 of a first embodiment is described below. FIG. 1 illustrates the structure of the information processing apparatus 1 of the first embodiment. Referring to FIG. 1, interrupting signals input to an interrupting signal control device 10 are illustrated as interruption factors. The interruption factors include interruption factors A-D.

As illustrated in FIG. 1, the information processing apparatus 1 includes interrupting signal control device 10 and clock control device 100. The interrupting signal control device 10 includes a mask controller 11. The clock control device 100 includes an interrupting clock signal controller 110.

The mask controller 11 determines whether to mask sending of an interrupting signal as a trigger signal triggering a predetermined process. When the sending of the interrupting signal is not masked, the interrupting clock signal controller 110 sends a clock signal to the interrupting signal control device 10. When the sending of the interrupting signal is masked, the interrupting clock signal controller 110 stops sending the clock signal to the interrupting signal control device 10.

The interrupting clock signal controller 110 receives the clock signal (labeled CLK) to the interrupting signal control device 10. The interrupting clock signal controller 110 sends the clock signal to the interrupting signal control device 10.

The interrupting signal control device 10 is ready to operate in response to the reception of the clock signal.

Upon receiving the interruption factor A, the mask controller 11 performs a mask process on the received interruption factor A. The mask controller 11 then sends to the interrupting clock signal controller 110 information indicating that the mask process has been executed. When the sending of the interruption factor A is masked, the interrupting clock signal controller 110 stops sending the clock signal to the interrupting signal control device 10.

As described above, the information processing apparatus 1 stops sending the clock signal when the interrupting signal is masked, and sends the clock signal when the interrupting signal is not masked. As a result, the information processing apparatus 1 controls extra power consumption in comparison with the related art technique in which only the clock signal to the DSP is controlled.

Second Embodiment

Structure of Information Processing Apparatus of Second Embodiment

Figure 2:
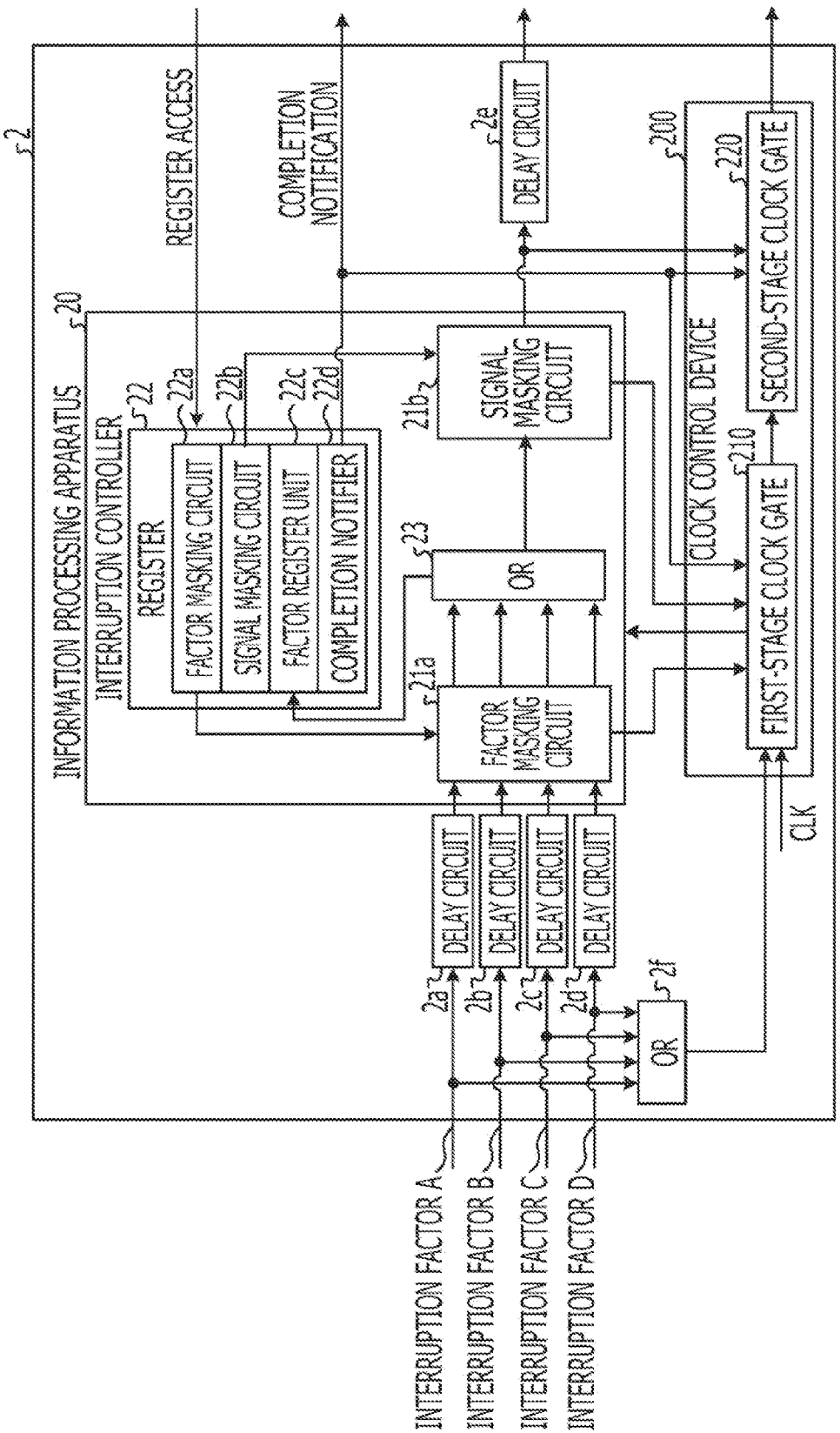
FIG. 2 illustrates a structure of an information processing apparatus of a second embodiment.

A structure of an information processing apparatus 2 of a second embodiment is described below. FIG. 2 illustrates the structure of the information processing apparatus 2 of the second embodiment. An interruption controller 20 illustrated in FIG. 2 sends an interrupting signal to a multi-DSP in response to the sending of a clock signal to a clock control device 200.

The interruption controller 20 and the DSP remain at an idle state until a clock signal is received. Referring to FIG. 2, the interruption factors A-D to be input to the interruption controller 20 are interrupting signals. The number of interruption factors is not limited to four. The interruption controller 20 may be a master or a slave.

As illustrated in FIG. 2, the information processing apparatus 2 includes delay circuits 2a-2e, OR gate 2f, interruption controller 20, and clock control device 200. The interruption controller 20 includes factor masking circuit 21a, signal masking circuit 21b, register 22, and OR gate 23. The register 22 includes factor masking unit 22a, signal masking unit 22b, factor register unit 22c, and completion notifier 22d. The register 22 stores a variety of information and performs a variety of control operations using such stored information. The clock control device 200 includes first-stage clock gate 210, and second-stage clock gate 220.

The factor masking unit 22a stores factor mask information indicating which interruption factor to mask out of the interrupting factors input to the interruption controller 20. The signal masking unit 22b stores signal mask information indicating masking of all interruption factors input to the interruption controller 20, i.e., indicating the masking of the interrupting signals to the DSP.

When one of the interrupting signals is input to the interruption controller 20 and passes through the factor masking circuit 21a, the factor register unit 22c receives and stores factor information indicating the interruption factor input via the OR gate 23. When the process in the DSP is completed, the completion notifier 22d receives a completion notification indicating the completion of the process, and then sends to another corresponding interruption controller the completion notification of the process as an interrupting signal between interruption controllers. The completion notifier 22d sends the completion notification to the other interruption controller while also sending the completion notification to the first-stage clock gate 210 and the second-stage clock gate 220.

The factor masking circuit 21a acquires from the factor masking unit 22a the factor mask information of a signal serving as a mask target from among the interruption factors, and masks the corresponding interruption factor. When the input interruption factor is not a mask target, the factor masking circuit 21a sends a signal to the OR gate 23. When the input interruption factor is a mask target, the factor masking circuit 21a sends to the first-stage clock gate 210 factor mask information indicating that the interruption factor has been masked.

In response to the reception of an interruption factor, the OR gate 23 inputs to the factor register unit 22c factor register information indicating that the interruption factor has been received. In response to the reception of any interruption factor, the OR gate 23 inputs to the signal masking circuit 21b a signal indicating that the interruption signal has been received.

The signal masking circuit 21b receives signal mask information from the signal masking unit 22b. The signal mask information is used to mask the interrupting signal directed to the interruption controller 20. In response to the reception of the signal from the OR gate 23, the signal masking circuit 21b executes a mask process on the interrupting signal to the interruption controller 20, or executes a sending process of the interrupting signal to the DSP.

Upon executing the sending process of the interrupting signal to the DSP, the signal masking circuit 21b also performs the sending process of the interrupting signal to the second-stage clock gate 220. Upon executing the mask process of the interrupting signal, the signal masking circuit 21b sends to the first-stage clock gate 210 interrupting signal mask information indicating that the interrupting signal has been masked. The DSP, having received the interrupting signal, executes a desired process while performing register access to the interruption controller 20 in response to the acquisition of factor information or the notification of process completion.

The information processing apparatus 2 is an example of the information processing apparatus 1 of the first embodiment. The interruption controller 20 is an example of the interrupting signal control device 10 of the first embodiment. Similarly, the factor masking circuit 21a and the signal masking circuit 21b are examples of the mask controller 11 of the first embodiment.

The first-stage clock gate 210 receives the clock signal (labeled "CLK") addressed to each of the interruption controller 20 and the DSP. Upon receiving via the OR gate 2f one of the interruption factors A-D to the interruption controller 20, the first-stage clock gate 210 sends the clock signal to the interruption controller 20. The interruption controller 20, having received the clock signal, is set to be operational.

The first-stage clock gate 210 receives via the OR gate 2f one of the interruption factors A-D to the interruption controller 20, and sends the clock signal to the second-stage clock gate 220 that then sends the clock signal to the DSP.

The interruption factors A-D are respectively input to the delay circuits 2a-2d at prior stages to the interruption controller 20. The delay circuits 2a-2d prevent the interruption factors A-D from being input in a state with no clock signal being provided to the interruption controller 20, i.e., with the interruption controller 20 in an idle state.

The delay time caused by each of the delay circuits 2a-2d lasts from when each of the interruption factors A-D is received by the clock control device 200 to when the clock signal is sent to the interruption controller 20. The delay time may be preset. When the delay circuits 2a-2d are not arranged, each of the interruption factors A-D is simply sent again from the peripheral device. It is not necessary for the interruption factors A-D to be input through the delay circuits 2a-2d.

Upon receiving the factor mask information from the factor masking circuit 21a, the first-stage clock gate 210 stops sending the clock signal to the interruption controller 20. The first-stage clock gate 210 also stops sending the clock signal to the second-stage clock gate 220.

Upon receiving the signal mask information from the signal masking circuit 21b, the first-stage clock gate 210 stops sending the clock signal to the interruption controller 20. The first-stage clock gate 210 also stops sending the clock signal to the second-stage clock gate 220.

Upon receiving the completion notification from the completion notifier 22d, the first-stage clock gate 210 stops sending the clock signal to the interruption controller 20. The first-stage clock gate 210 also stops sending the clock signal to the second-stage clock gate 220.

In response to the reception of the interrupting signal from the signal masking circuit 21b, the second-stage clock gate 220 sends the clock signal to the DSP. The interrupting signal from the signal masking circuit 21b is input to the DSP via the delay circuit 2e. The delay circuit 2e prevents the interrupting signal from being input with no clock signal being provided to the DSP, i.e., with the DSP in an idle state.

The delay time caused by the delay circuit 2e lasts from when the interrupting signal is received by the clock control device 200 to when the clock signal is sent to the DSP. The delay time may be preset. When the delay circuit 2e is not arranged, the interrupting signal is simply sent from the interruption controller 20 again. It is not necessary for the interrupting signal to be input through the delay circuit 2e.

In response to the reception of the completion notification from the completion notifier 22d, the second-stage clock gate 220 stops sending the clock signal to the DSP. The clock control device 200 is an example of the clock control device 100 of the first embodiment. The first-stage clock gate 210 is an example of the interrupting clock signal controller 110 of the first embodiment.

When no task occurs in the DSP, both the first-stage clock gate 210 and the second-stage clock gate 220 remain in an off state. The first-stage clock gate 210 is set to be in an on state (with the clock signal sent) when one of the interruption factors A-D is input. The first-stage clock gate 210 is set to be in an off state (with the sending of the clock signal stopped) in response to the reception of the factor mask information, the reception of the signal mask information, or the reception of the completion notification. The second-stage clock gate 220 is set to be in an on state when an interrupting signal is input. The second-stage clock gate 220 is set to be in an off state when the completion notification is received.

Clock Control Process

Figure 3:
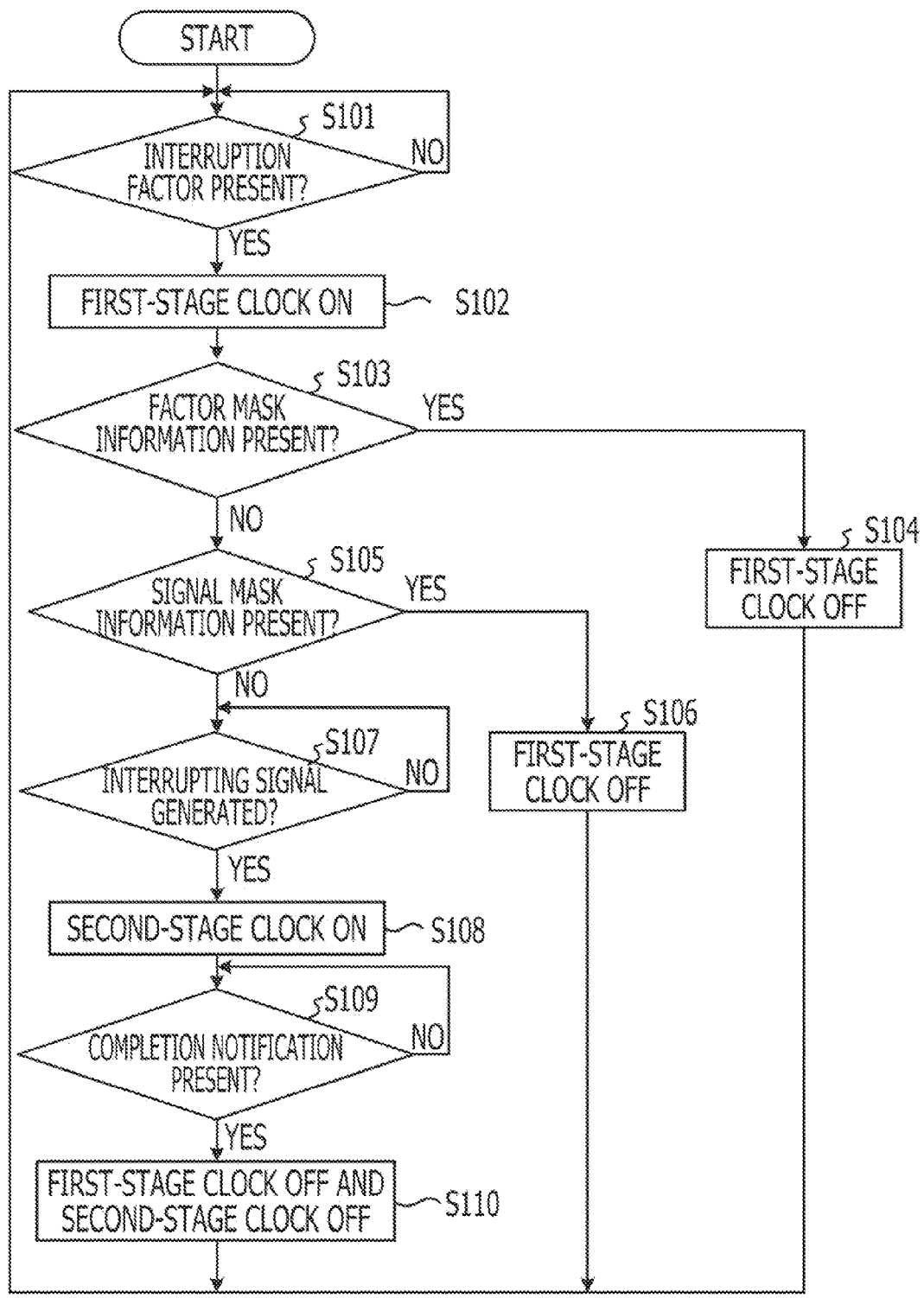
FIG. 3 is a flowchart illustrating a clock control process of the second embodiment.

A clock control process of the second embodiment is discussed with reference to FIG. 3. FIG. 3 is a flowchart illustrating the clock control process of the second embodiment. In the clock control process, the clock control device 200 performs a sending control process for sending the clock signal. In the discussion that follows, the first-stage clock gate 210 and the second-stage clock gate 220 are in an off state as an initial state.

As illustrated in FIG. 3, the clock control device 200 sets the first-stage clock gate 210 to be in an on state (operation S102) when an interruption factor is received (yes branch from operation S101). The first-stage clock gate 210 sends the clock signal to the interruption controller 20 and the second-stage clock gate 220. The clock control device 200 waits on standby for an interruption factor when no interrupting signal is received (no branch from operation S101).

When the first-stage clock gate 210 receives the factor mask information (yes branch from operation S103), the clock control device 200 sets the first-stage clock gate 210 to be in an off state (operation S104). The clock control device 200, having set the first-stage clock gate 210 to be in an off state, stops sending the clock signal to the interruption controller 20 and the second-stage clock gate 220, and then returns to standby waiting for an interruption factor.

When the first-stage clock gate 210 has received no factor mask information (no branch from operation S103), the clock control device 200 determines whether the signal mask information has been received (operation S105). When the first-stage clock gate 210 has received the signal mask information (yes branch from operation S105), the clock control device 200 sets the first-stage clock gate 210 to be in an off state (operation S106). The clock control device 200 having set the first-stage clock gate 210 to be in an off state stops sending the clock signal to the interruption controller 20 and the second-stage clock gate 220, and then returns to be on standby waiting for the reception of an interruption factor.

When no signal mask information has been received (no branch from operation S105), the clock control device 200 determines whether the second-stage clock gate 220 has received an interrupting signal (operation S107). When the second-stage clock gate 220 has received an interrupting signal (yes branch from operation S107), the clock control device 200 sets the second-stage clock gate 220 to be in an on state (operation S108). The second-stage clock gate 220 then starts sending the clock signal to the DSP. When no interrupting signal has been received (no branch from operation S107), the clock control device 200 waits on standby for the reception of an interrupting signal.

Upon receiving from the interruption controller 20 the completion notification of the process by the DSP (yes branch from operation S109), the clock control device 200 sets the first-stage clock gate 210 and the second-stage clock gate 220 to be in an off state (operation 5110). The clock control device 200 thus stops sending the clock signal to the interruption controller 20 and the DSP, and then returns to again wait on standby for the reception of an interruption factor. When no completion notification has been received (no branch from operation S109), the clock control device 200 waits on standby for the reception of a completion notification.

Time Chart of the Clock Control Process

Figure 4:
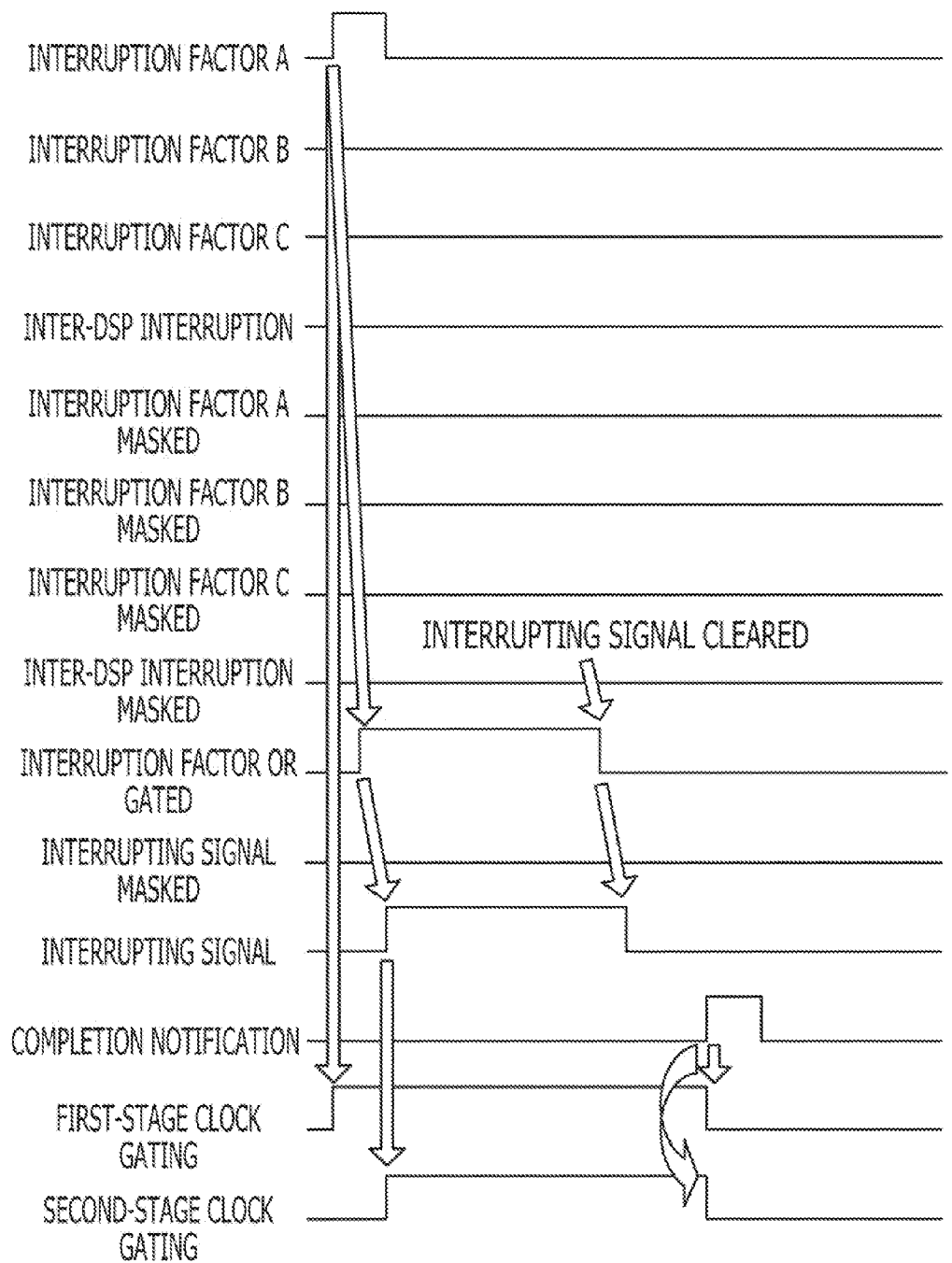
FIG. 4 is a time chart of the clock control process performed when neither factor masking nor signal masking is performed in accordance with the second embodiment.
Figure 5:
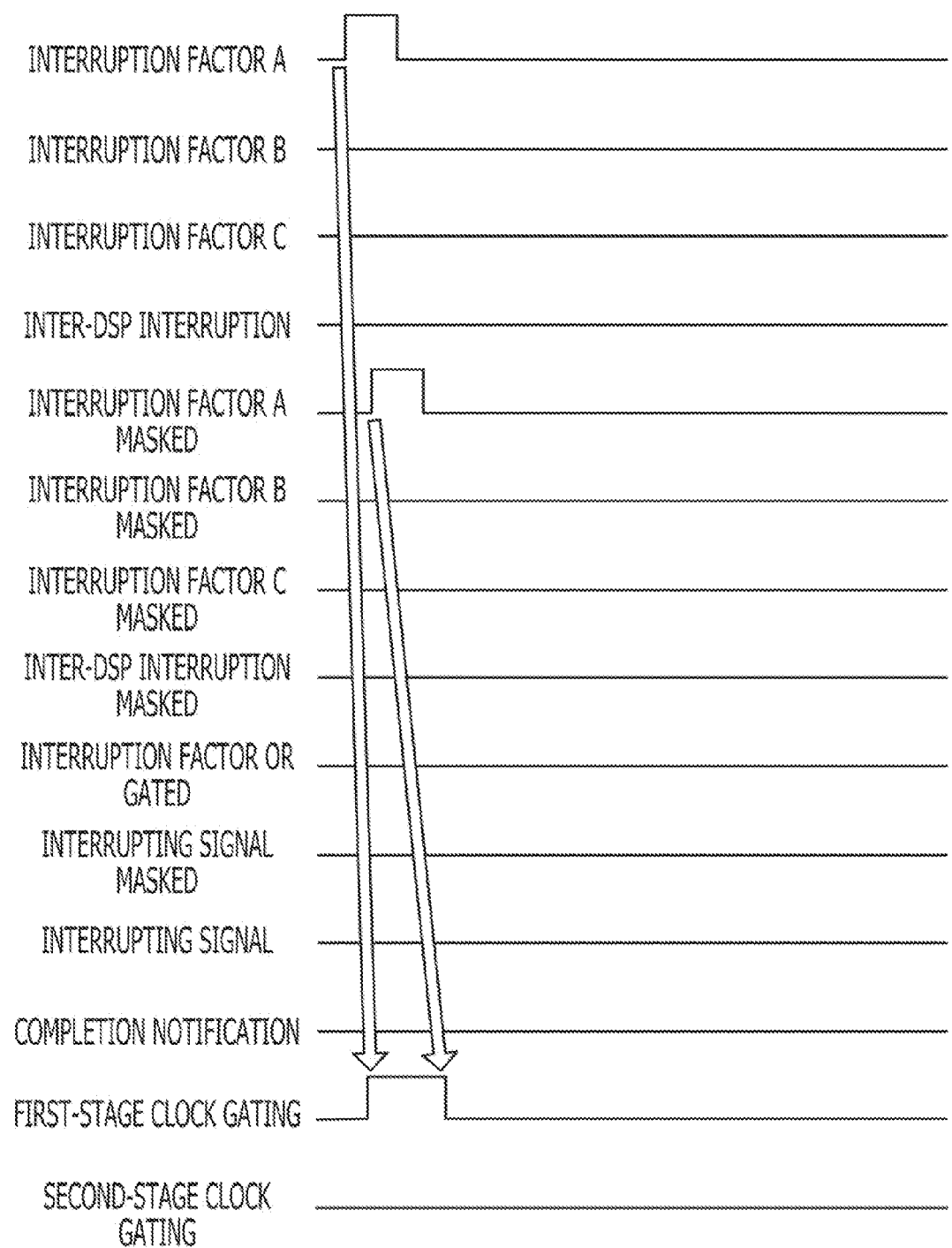
FIG. 5 is a time chart of the clock control process performed when the factor masking is performed in accordance with the second embodiment.
Figure 6:
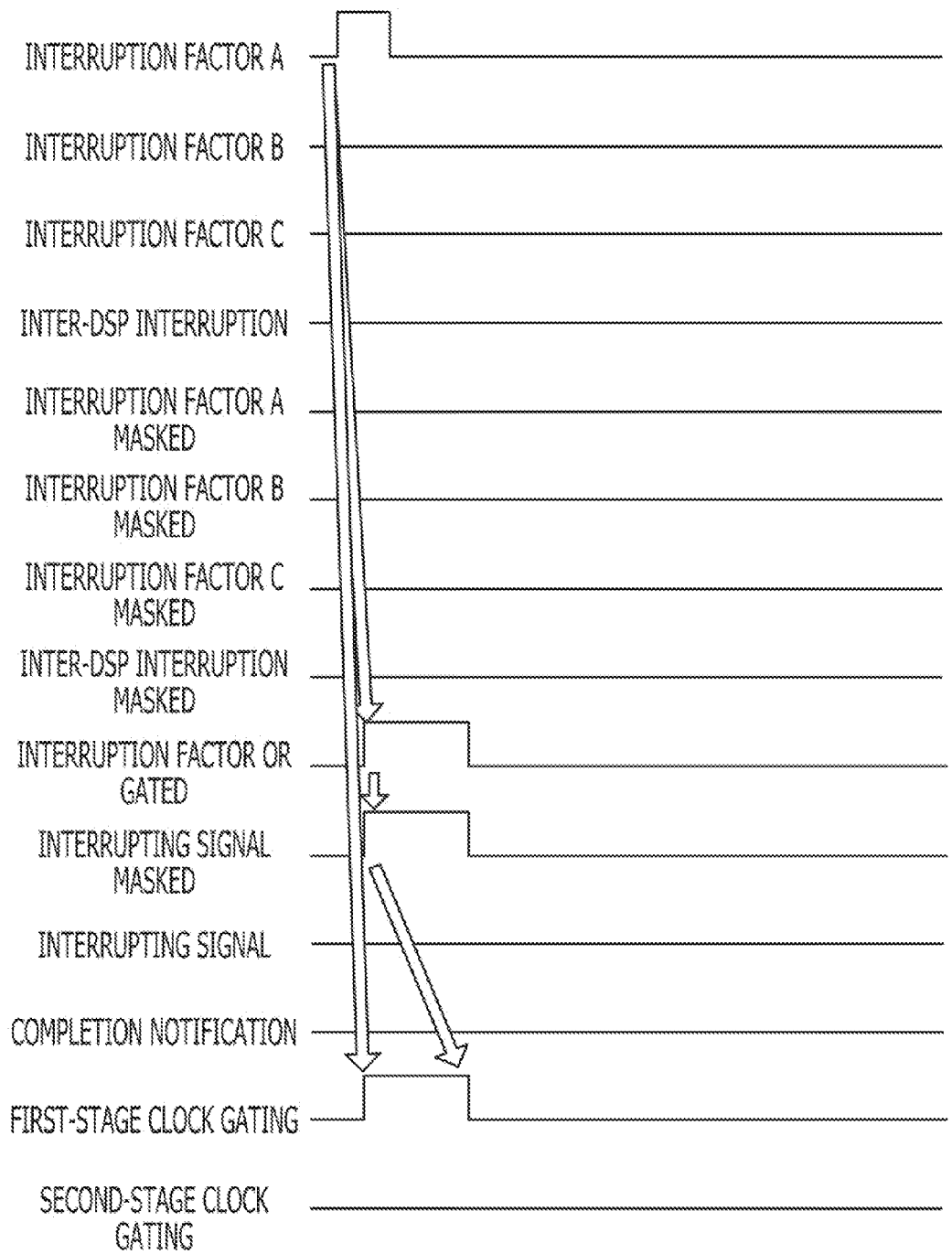
FIG. 6 is a time chart of the clock control process performed when the signal masking is performed in accordance with the second embodiment.
Figure 7:
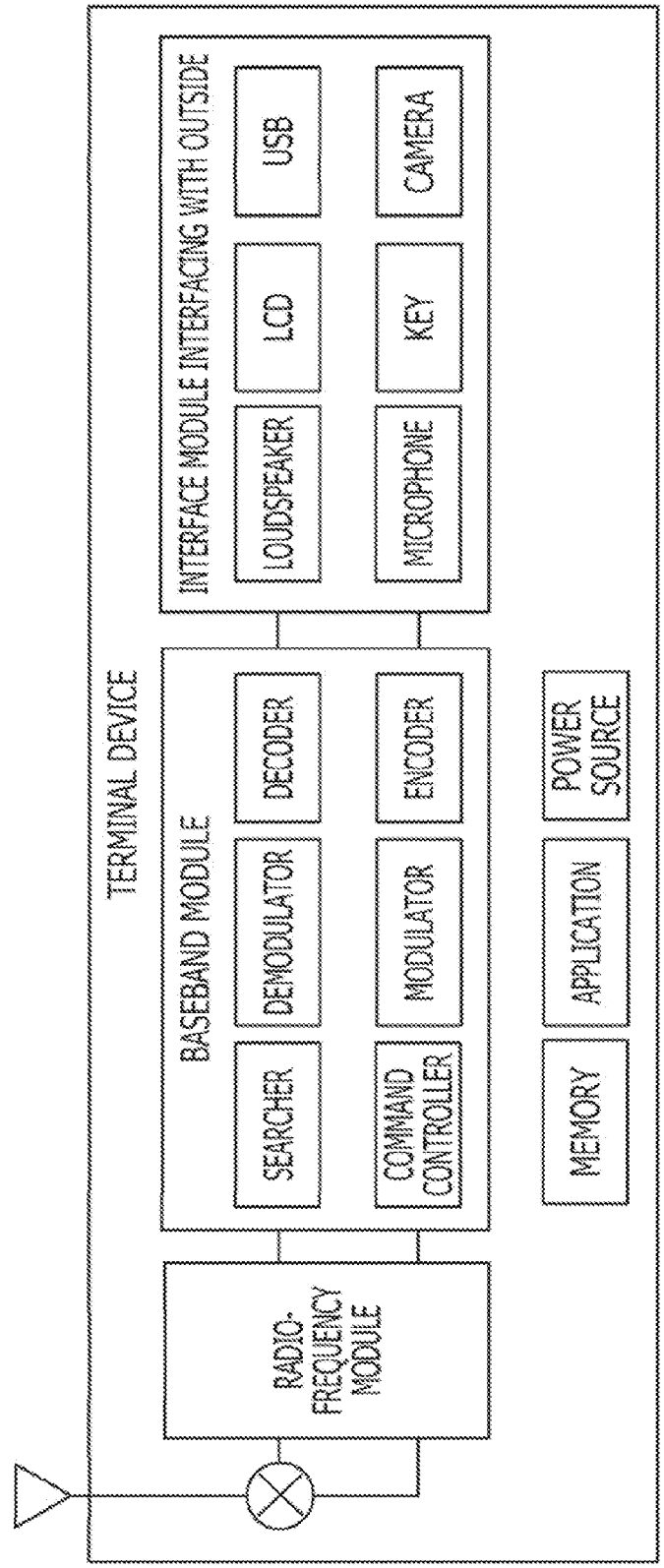
FIG. 7 illustrates a structure of a terminal device of related art.
Figure 8:
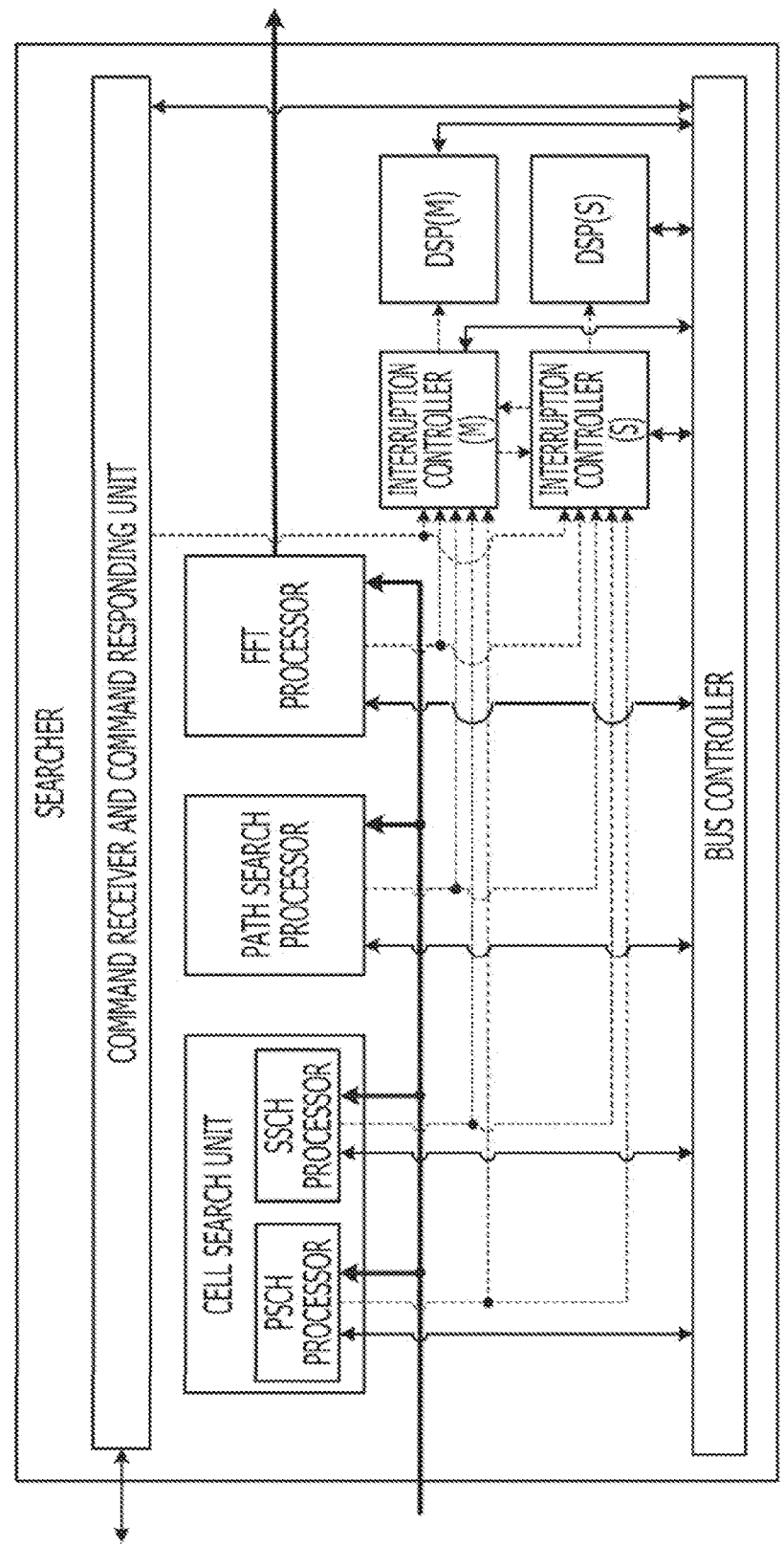
FIG. 8 illustrates a structure of a searcher of related art.
Figure 9:
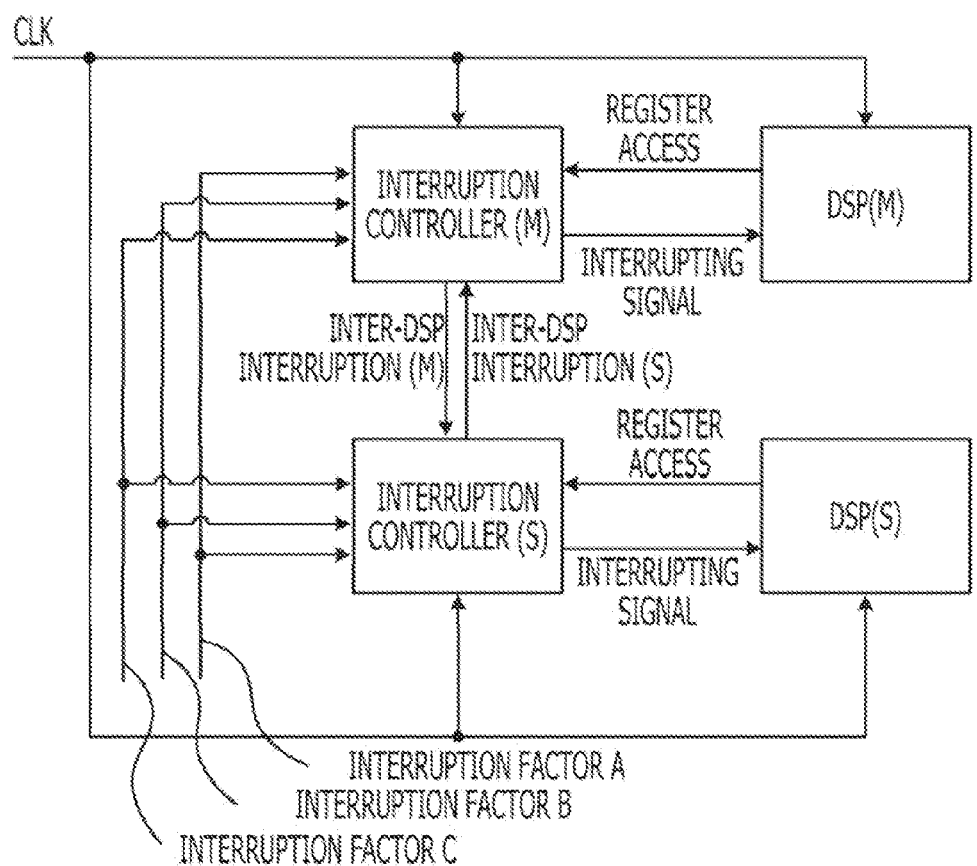
FIG. 9 illustrates an interrupting signal and a clock signal in a multi-DSP of related art.

Time charts of the clock control process of the second embodiment are described with reference to FIGS. 4-6. FIG. 4 is the time chart of the clock control process in which neither factor masking nor signal masking are performed. FIG. 5 is the time chart of the clock control process in which the factor masking is performed. FIG. 6 is the time chart of the clock control process in which the signal masking is performed.

Masking Neither Factor Nor Signal

FIG. 4 is the time chart of the clock control process in which neither factor masking nor signal masking is performed in accordance with the second embodiment. As illustrated in FIG. 4, the interruption factor A of the interruption factors A-C is input.

When the interruption factor A is input as illustrated in FIG. 4, the clock control device 200 sets the first-stage clock gate 210 to an on state to transmit the clock signal to the interruption controller 20. The interruption controller 20 is set to be operational in response to the reception of the clock signal. In response to the reception of the interruption factor A, the interruption controller 20 sends the interrupting signal to the DSP via the OR gate 23. The interruption controller 20 also sends the interrupting signal to the clock control device 200. After sending the interrupting signal, the interruption controller 20 clears the interrupting signal.

The clock control device 200, having received the interrupting signal, sets the second-stage clock gate 220 to be in an on state, and sends the clock signal to the DSP. In response to the reception of the clock signal, the DSP becomes operational. The DSP executes a desired process in response to the reception of the interrupting signal, and sends to the interruption controller 20 the completion notification in response to the completion of the process.

The interruption controller 20, having received the completion notification, sends the completion notification to the clock control device 200. Upon receiving the completion notification, the clock control device 200 sets the first-stage clock gate 210 and the second-stage clock gate 220 to be in an off state, and stops sending the clock signal to the interruption controller 20 and the DSP.

Masking Factor

FIG. 5 is the time chart of the clock control process in which the factor masking is performed in accordance with the second embodiment. As illustrated in FIG. 5, the interruption factor A of the interruption factors A-C is input and also serves as a mask target.

When the interruption factor A is input as illustrated in FIG. 5, the clock control device 200 sets the first-stage clock gate 210 to be in an on state, and sends the clock signal to the interruption controller 20. The interruption controller 20, having become operational in response to the reception of the clock signal, performs a mask process on the interruption factor A in response to the reception of the interruption factor A. The interruption controller 20 then sends the factor mask information to the clock control device 200.

The clock control device 200 then sets the first-stage clock gate 210 to be in an off state, thereby stopping sending the clock signal to the interruption controller 20. The interruption controller 20 becomes idle in response to the stopping of the sending of the clock signal and ends the mask process on the interruption factor A.

Masking Signal

FIG. 6 is the time chart of the clock control process in which the signal masking is performed in accordance with the second embodiment. Referring to FIG. 6, the interruption factor A of the interruption factors A-C is input and a mask target is the interrupting signal to the DSP.

When the interruption factor A is input as illustrated in FIG. 6, the clock control device 200 sets the first-stage clock gate 210 to an on state, thereby sending the clock signal to the interruption controller 20. The interruption controller 20 becomes operational in response to the reception of the clock signal and performs the mask process on the interrupting signal to the DSP via the OR gate 23 in response to the reception of the interruption factor A. The interruption controller 20 sends the signal mask information to the clock control device 200.

The clock control device 200, having received the signal mask information, sets the first-stage clock gate 210 to be in an off state, thereby stopping the sending of the clock signal to the interruption controller 20. The interruption controller 20 becomes idle in response to stopping the sending of the clock signal. In the interruption controller 20, the operation of the OR gate 23 and the mask process of the interrupting signal is also ended.

Advantages of the Second Embodiment

As described above, the information processing apparatus 2 immediately prior to the start of the process and immediately after the stop of the process respectively supplies and stops supplying the clock signal to the interruption controller 20 and the DSP that starts the process in response to the interrupting signal sent by the interruption controller 20. As a result, the information processing apparatus 2 efficiently controls the sending of the clock signal to the interruption controller 20 and the DSP closely related in the process in each apparatus. Extra power consumption is thus restricted.

Third Embodiment

The embodiments of the information processing apparatus described in the present application have been discussed. A variety of different embodiments may be implemented. Embodiments different in terms of (1) the factor masking circuit, and the signal masking circuit, and (2) the apparatus structure are described below.

(1) Factor Masking Circuit, and Signal Masking Circuit

Discussed in accordance with the second embodiment is the interruption controller 20 including the factor masking circuit performing the mask process on the interruption factor and the signal masking circuit performing the mask process on the interrupting signal to the DSP. The interruption controller 20 may include one of the factor masking circuit and the signal masking circuit.

When the interruption controller 20 includes the factor masking circuit only, the clock control device 200 stops sending the clock signal in response to an interruption factor input as a mask target to the interruption controller 20. When the interruption controller 20 includes the signal masking circuit only, the interruption factor is received by an interruption controller 20. The clock control device 200 stops sending the clock signal when the interrupting signal is masked.

(2) Apparatus Structure

Information including the process operations, the control operations, the specific names of elements, and the variety of data and parameters (for example, a specific name is "the first-stage clock gate 210") described in the above discussion and illustrated in the drawings may be modified unless otherwise particularly noted.

The elements of the interruption controller and the clock control device represent functional concepts, and are not necessarily physically constructed as illustrated. The specific implementation of splitting and integration of each apparatus is not limited to the implementation illustrated. Whole or part of the apparatus may be functionally or physically split or integrated by any unit depending on a variety of workloads and usage status of the apparatus.

The factor masking circuit 21a and the signal masking circuit 21b may be integrated into the "mask controller" as in the first embodiment. Similarly, the first-stage clock gate 210 and the second-stage clock gate 220 may be integrated into a "clock gate." In the above discussion of the embodiments, the multi-DSP includes the master and the slave. When the DSP is allowed to be idle during operation, the use of a single DSP is acceptable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus, comprising:
an interrupting signal control device including a mask controller, the mask controller controls whether or not to mask at least one interrupting signal serving as a trigger signal triggering a predetermined process; and
a clock control device including an interrupting clock signal controller, the interrupting clock signal controller sends a clock signal to the interrupting signal control device when at least one interrupting signal is not masked, and stops sending the clock signal to the interrupting signal control device when at least one interrupting signal is masked.

2. The information processing apparatus according to claim 1, wherein at least one interrupting signal is a plurality of interrupting signals, and
wherein the mask controller includes a predetermined signal mask control unit that controls whether or not to mask a predetermined interrupting signal of the interrupting signals.

3. The information processing apparatus according to claim 1, wherein at least one interrupting signal is a plurality of interrupting signals, and
wherein the mask controller includes an all-signal mask control unit that controls whether or not to mask all of the interrupting signals.

4. The information processing apparatus according to claim 1, wherein the interrupting signal control device includes an interrupting signal transmitter that sends the interrupting signal to the clock control device and an arithmetic processing device executing the predetermined process when the interrupting signal is not masked, and
wherein the clock control device includes an arithmetic clock signal controller, the arithmetic clock signal controller sends the clock signal to the arithmetic processing device when the interrupting signal is received.

5. The information processing apparatus according to claim 1, further comprising a delay circuit, arranged at a preceding stage to the interrupting signal control device and that delays inputting of the interrupting signal to the interrupting signal control device,
wherein the interrupting clock signal controller sends the clock signal to the interrupting signal control device when the interrupting signal to the interrupting signal control device is received.

6. The information processing apparatus according to claim 1, wherein the interrupting clock signal controller receives the clock signal and a feedback signal from the mask controller, the feedback signal indicating whether the at least one interrupting signal is masked.

7. The information processing apparatus according to claim 4, wherein the interrupting signal control device includes a completion notifier, the completion notifier receives a completion notification of the predetermined process sent from the arithmetic processing device and sends the completion notification to the clock control device, and
wherein the arithmetic clock signal controller stops sending the clock signal to the arithmetic processing device when the completion notification is received, and
wherein the interrupting clock signal controller stops sending the clock signal to the interrupting signal control device when the completion notification is received.

8. The information processing apparatus according to claim 4, further comprising a delay circuit, arranged at a preceding stage to the arithmetic processing device and that delays inputting of the interrupting signal to the arithmetic processing device.

9. A clock signal controlling method in an information apparatus, the method comprising:
determining by an interrupting signal control device whether or not to mask at least one interrupting signal serving as a trigger signal triggering a predetermined process; and
sending a clock signal to the interrupting signal control device when at least one interrupting signal is not masked, and stopping sending the clock signal to the interrupting signal control device when at least one interrupting signal is masked.

10. The clock signal controlling method according to claim 9, wherein at least one interrupting signal is a plurality of interrupting signals, and
the determining determines whether or not to mask a predetermined interrupting signal of the interrupting signals.

11. The clock signal controlling method according to claim 9, wherein at least one interrupting signal is a plurality of interrupting signals, and
the determining determines whether or not to mask all of the interrupting signals.

12. The clock signal controlling method according to claim 9, wherein the method comprises:
sending the interrupting signal by the interrupting signal control device to an arithmetic processing device executing the predetermined process when the determining determines to not mask the interrupting signal, and
sending the clock signal to the arithmetic processing device according to the sending of the interrupting signal.

13. The clock signal controlling method according to claim 9, the method comprises delaying the inputting of the interrupting signal to the interrupting signal control device, and
wherein the sending of the clock signal to the interrupting signal control device sends the clock signal to the interrupting signal control device when the interrupting signal is received.

14. The clock signal controlling method according to claim 9, further comprising:
receiving the clock signal and a feedback signal from the mask controller, the feedback signal indicating whether the at least one interrupting signal is masked.

15. The clock signal controlling method according to claim 12, the method comprises:
receiving a completion notification of the predetermined process sent from the arithmetic processing device,
stopping the sending of the clock signal to the arithmetic processing device when the completion notification is received, and
wherein the stopping of sending the clock signal stops the clock signal to the interrupting signal control device when the completion notification is received.

16. The clock signal controlling method according to claim 12, the method comprises delaying the inputting of the interrupting signal to the arithmetic processing device.

* * * * *